US012460580B1

(12) United States Patent
Alecu

(10) Patent No.: US 12,460,580 B1
(45) Date of Patent: Nov. 4, 2025

(54) HEAT MANAGEMENT SYSTEM AND METHOD FOR HYDROGEN-FUELED ENGINE

(71) Applicant: PRATT & WHITNEY CANADA CORP., Longueuil (CA)

(72) Inventor: Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/979,990

(22) Filed: Dec. 13, 2024

(51) Int. Cl.
   *F02C 7/224* (2006.01)
   *F02C 3/22* (2006.01)
   *F02C 7/18* (2006.01)
   *F23R 3/00* (2006.01)

(52) U.S. Cl.
   CPC ........... *F02C 7/224* (2013.01); *F02C 3/22* (2013.01); *F02C 7/18* (2013.01); *F23R 3/005* (2013.01)

(58) Field of Classification Search
   CPC .. F02C 7/22; F02C 7/222; F02C 7/224; F02C 3/20; F02C 3/22; F02C 7/12; F02C 7/14; F02C 7/16; F02C 7/18; F23R 3/005
   See application file for complete search history.

(56) References Cited

U.S. PATENT DOCUMENTS

| | | | |
|---|---|---|---|
| 3,237,401 A * | 3/1966 | Peters | F02C 7/224 60/260 |
| 4,792,651 A | 12/1988 | Whiting | |
| 6,079,222 A * | 6/2000 | Fetescu | F17C 9/04 62/915 |
| 9,441,598 B2 | 9/2016 | Futa et al. | |
| 10,941,683 B2 | 3/2021 | Poster | |
| 10,989,117 B2 * | 4/2021 | Roberge | F02C 3/22 |
| 11,661,889 B1 * | 5/2023 | Muldoon | F02C 3/22 415/116 |
| 12,215,622 B1 * | 2/2025 | Terwilliger | F02C 3/22 |
| 2005/0016591 A1 | 1/2005 | Griffiths et al. | |
| 2020/0088102 A1 * | 3/2020 | Roberge | F02C 7/224 |
| 2021/0207537 A1 * | 7/2021 | Roberge | F04B 9/02 |
| 2021/0207540 A1 * | 7/2021 | Roberge | F02C 9/40 |
| 2021/0340908 A1 * | 11/2021 | Boucher | F02C 7/224 |
| 2021/0348561 A1 * | 11/2021 | Cocks | F02C 7/12 |
| 2022/0099299 A1 * | 3/2022 | Carrotte | F02C 3/22 |
| 2022/0195928 A1 * | 6/2022 | Johnson | F02C 7/16 |
| 2023/0375176 A1 * | 11/2023 | Owoeye | F02C 7/224 |
| 2024/0011417 A1 * | 1/2024 | Sibbach | F01D 21/12 |
| 2024/0360786 A1 * | 10/2024 | Evans | F02C 7/224 |
| 2024/0360787 A1 * | 10/2024 | Evans | F02C 3/30 |
| 2024/0360788 A1 * | 10/2024 | Evans | F02C 3/22 |
| 2025/0084793 A1 * | 3/2025 | Sibbach | F01K 23/10 |

* cited by examiner

*Primary Examiner* — William H Rodriguez
(74) *Attorney, Agent, or Firm* — NORTON ROSE FULBRIGHT CANADA LLP

(57) ABSTRACT

A heat management system for a thermal engine includes a source of hydrogen, a first hydrogen conduit flowing a first flow of hydrogen therethrough, the first hydrogen conduit fluidly coupling the source of hydrogen to a fuel system of the thermal engine, and a second hydrogen conduit flowing a second flow of hydrogen therethrough. The second hydrogen conduit is in thermal communication with an engine exhaust conduit to transfer heat from the engine exhaust conduit to the second hydrogen conduit. The second hydrogen conduit is also in thermal communication with the first hydrogen conduit to transfer heat from the second hydrogen conduit to the first hydrogen conduit.

17 Claims, 3 Drawing Sheets

HEAT MANAGEMENT SYSTEM AND METHOD FOR HYDROGEN-FUELED ENGINE

TECHNICAL FIELD

The disclosure relates generally to aircraft engines and, more particularly, to heat management systems in aircraft engines.

BACKGROUND

Aircraft engines that use traditional fuels such as kerosene typically rely on fuel as a cooling agent, for instance to cool the engine's oil systems. In some cases, additional air cooling is often required. Alternative fuels such as hydrogen are considered for aircraft engines, for instance to improve emissions. This presents new considerations with regards to engine cooling, as fuels such as hydrogen provide different heat capacities than legacy fuels such as kerosene. Improvements are thus desired.

SUMMARY

There is accordingly provided a heat management system for a thermal engine, comprising: a source of hydrogen; a first hydrogen conduit flowing a first flow of hydrogen therethrough, the first hydrogen conduit fluidly coupling the source of hydrogen to a fuel system of the thermal engine; and a second hydrogen conduit flowing a second flow of hydrogen therethrough, the second hydrogen conduit in thermal communication with an engine exhaust conduit to transfer heat from the engine exhaust conduit to the second hydrogen conduit, the second hydrogen conduit further in thermal communication with the first hydrogen conduit to transfer heat from the second hydrogen conduit to the first hydrogen conduit.

The heat management system as defined above and described herein also includes, in certain embodiments, one or more of the following features, in whole or in part, and in any combination.

In certain aspects, a first heat exchanger exchanges heat between the first hydrogen conduit and the second hydrogen conduit, and a second heat exchanger exchanging heat between the second hydrogen conduit and the engine exhaust conduit.

In certain aspects, the second flow of hydrogen in the second hydrogen conduit circulates between an engine cooling unit, the second heat exchanger and the first heat exchanger.

In certain aspects, an additional fluid conduit flowing an additional engine fluid therethrough, the second hydrogen conduit in thermal communication with the additional fluid conduit to transfer heat thereto, the additional fluid conduit in thermal communication with the first hydrogen conduit to transfer heat thereto.

In certain aspects, the additional fluid conduit includes a mixer and a separator, the mixer configured to mix the additional engine fluid with the first flow of hydrogen to transfer heat from the additional engine fluid to the first flow of hydrogen, the separator configured to separate the additional engine fluid from the first flow of hydrogen downstream of the mixer.

In certain aspects, the additional fluid conduit includes a rotor downstream of the separator, the rotor configured for extracting work from the flow of additional engine fluid.

In certain aspects, the additional fluid conduit further includes an engine cooling unit, the flow of additional engine fluid circulating between the engine cooling unit, the mixer, and the separator.

In certain aspects, a heat exchanger exchanging heat between the engine exhaust conduit and the second hydrogen conduit.

In certain aspects, the additional fluid conduit further includes a mixer and a separator, the mixer configured to mix the additional engine fluid with the second flow of hydrogen to transfer heat from the second flow of hydrogen to the additional engine fluid, the separator configured to separate the additional engine fluid from the second flow of hydrogen downstream of the mixer.

In certain aspects, the first flow of hydrogen in the first hydrogen conduit operates at a first pressure and the second flow of hydrogen in the second hydrogen conduit operates at a second pressure less than the first pressure.

In certain aspects, the first hydrogen conduit includes an expander disposed upstream of the fuel system of the thermal engine.

There is also provided an aircraft engine, comprising: an engine exhaust conduit; a hydrogen fuel conduit flowing hydrogen fuel from a source of hydrogen to a fuel system of the aircraft engine; and a engine cooling conduit circulating an additional flow of hydrogen from an engine cooling unit to a first heat transfer device and to a second heat transfer device, the first heat transfer device and the second heat transfer device transferring heat from the engine exhaust conduit to the hydrogen fuel conduit, the engine cooling conduit acting as an intermediate for the transfer of heat between the engine exhaust conduit and the hydrogen fuel conduit.

The aircraft engine as defined above and described herein also includes, in certain embodiments, one or more of the following features, in whole or in part, and in any combination.

In certain aspects, the first heat transfer device is a first heat exchanger exchanging heat between the hydrogen fuel conduit and the engine cooling conduit, and the second heat transfer device is a second heat exchanger exchanging heat between the engine cooling conduit and the engine exhaust conduit.

In certain aspects, the additional flow of hydrogen in the engine cooling conduit circulates between an engine cooling unit, the second heat exchanger and the first heat exchanger.

In certain aspects, an additional fluid conduit flowing an additional engine fluid therethrough, the engine cooling conduit in thermal communication with the additional fluid conduit to transfer heat thereto, the additional fluid conduit in fluid communication with the hydrogen fuel conduit to transfer heat thereto.

In certain aspects, the additional fluid conduit includes a mixer and a separator, the mixer configured to mix the additional engine fluid with the fuel to transfer heat from the additional engine fluid to the flow of hydrogen fuel, the separator configured to separate the additional engine fluid from the flow of hydrogen fuel downstream of the mixer.

In certain aspects, a heat exchanger exchanging heat between the engine exhaust conduit and the engine cooling conduit, and wherein the additional fluid conduit further includes a mixer and a separator, the mixer configured to mix the additional engine fluid with the additional flow of hydrogen to transfer heat from the additional flow of hydrogen to the additional engine fluid, the separator configured to separate the additional engine fluid from the additional flow of hydrogen downstream of the mixer.

In certain aspects, the flow of hydrogen fuel in the hydrogen fuel conduit operates at a first pressure and the additional flow of hydrogen in the engine cooling conduit operates at a second pressure less than the first pressure.

In certain aspects, the hydrogen fuel conduit includes an expander disposed upstream of the fuel system.

There is further provided a method of operating a heat management system for a thermal engine, comprising: flowing a first flow of hydrogen from a source of hydrogen to a fuel system of the thermal engine; circulating a second flow of hydrogen between an engine cooling unit, a first heat transfer device, and a second heat transfer device; transferring heat from the second flow of hydrogen to the first flow of hydrogen at the first heat transfer device; and transferring heat from an engine exhaust pathway to the second flow of hydrogen at the second heat transfer device.

BRIEF DESCRIPTION OF THE DRAWINGS

Reference is now made to the accompanying figures in which.

DETAILED DESCRIPTION

The present disclosure provides heat management systems and methods for a thermal engine, for instance a gas turbine engine for use in an aircraft, that use hydrogen as a source of fuel. These systems and methods exploit the heat transfer properties of hydrogen to provide improvements in the cooling of such engines. In various cases, multiple hydrogen conduits flow hydrogen throughout the system, removing heat from sources such as an engine exhaust conduit and an engine cooling unit to provide heat to a flow of hydrogen. In some embodiments, an additional fluid conduit is provided to further improve heat transfer efficiency. In some embodiments, various components such as expanders and rotors are provided to extract work from the various flowing fluids. The provided systems may be more compact and efficient than comparable legacy heat exchange devices.

Figure 1:
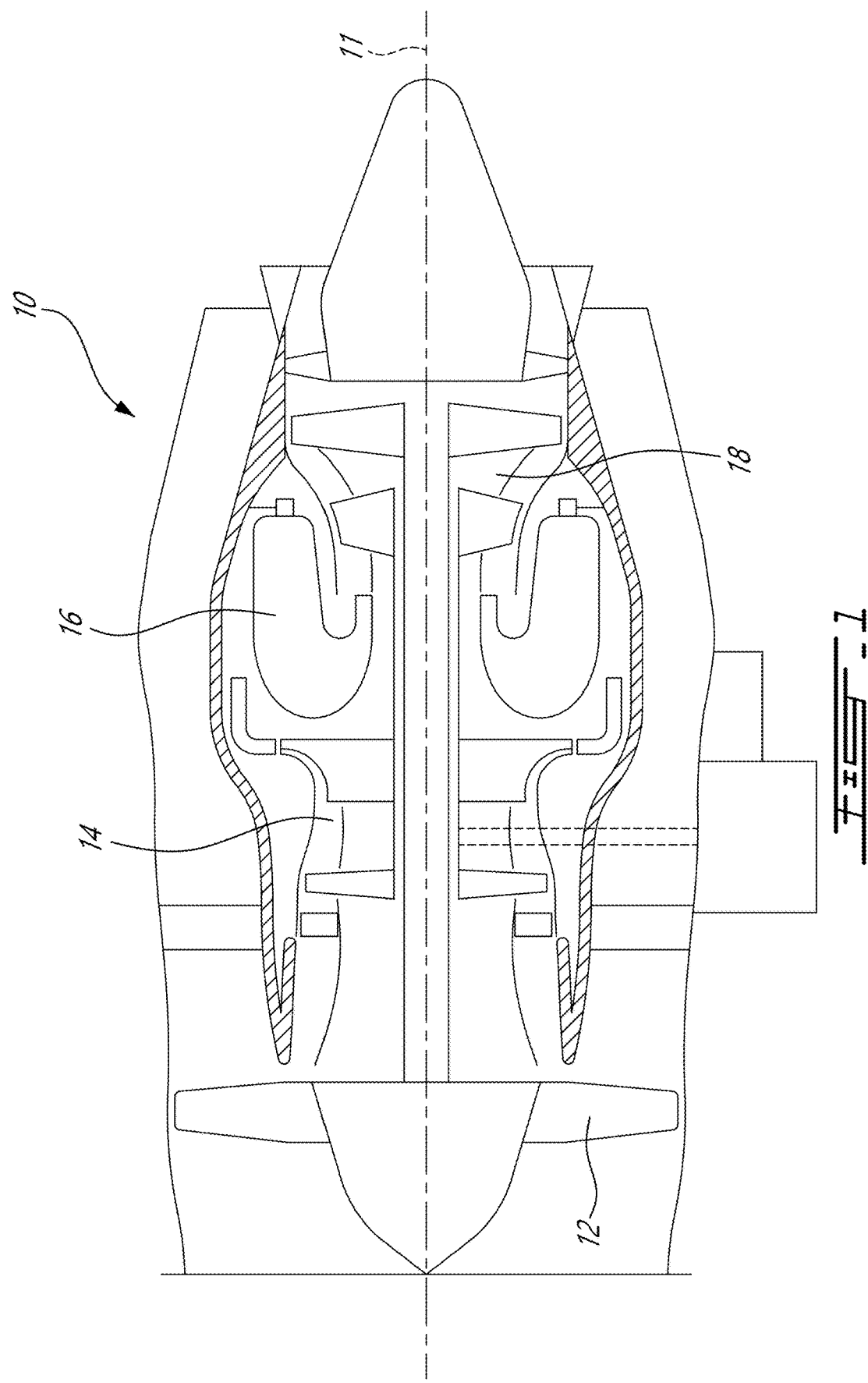
FIG. 1 is a schematic cross sectional view of a gas turbine engine.

FIG. 1 illustrates an example engine 10 of a type provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A longitudinal main engine axis 11 extends through the center of the engine 10. Although a turbofan engine 10 is shown in FIG. 1 for exemplary purposes, it is to be understood that the engine 10 as described herein may alternately be another type of gas turbine engine, including for example turboshafts, turboprops, and turbojets, or another type of combustion engine, such as a Wankel engine or a reciprocating engine. As such, the expression "combustor" should be understood to include any chamber within an engine in which combustion can occur. In some embodiments, the engine 10 forms part of an aircraft. In some embodiments, the engine 10 forms part of a vehicle for land or marine applications. In some embodiments, the engine 10 is used in an industrial setting, for example for power generation or as an auxiliary power unit. Engine 10 is powered in part or entirely by hydrogen. Engine 10 may also be a hybrid or bi-fuel propulsion system, in which two different fuel types (e.g. an alternative fuel such as hydrogen, as well as a traditional jet fuel) may be used.

Assuming a same combustion heat rate, the heat capacity of hydrogen is approximately two and a half times that of kerosene-type fuels, within a same temperature range. In addition, as hydrogen can tolerate higher maximum temperatures than kerosene, the heat absorption capacity of hydrogen fuel could exceed ten to fifteen times that of kerosene. It thus follows that heat management of hydrogen-fueled engines requires new approaches. While typical heat management systems rely on heat exchangers, the use of hydrogen as a fuel raises challenges. For instance, due to the high temperature and pressure gradients between the cold and hot sides, cracks and leaks may occur.

A heat management system 100 for a thermal engine, for instance engine 10, is shown and described. As will be explained in further detail below, the heat management system 100 includes generally two hydrogen circuits, namely a high pressure circuit from the source of hydrogen and an intermediate circuit. In one embodiment, a heat exchanger is provided to transfer heat between the two hydrogen conduits. In another embodiment, instead of a heat exchanger being provided between the two hydrogen circuits, an intermediate fluid circuit is provided to transfer heat between the two circuits—as well as between these circuits and other parts of the engine.

Figure 2:
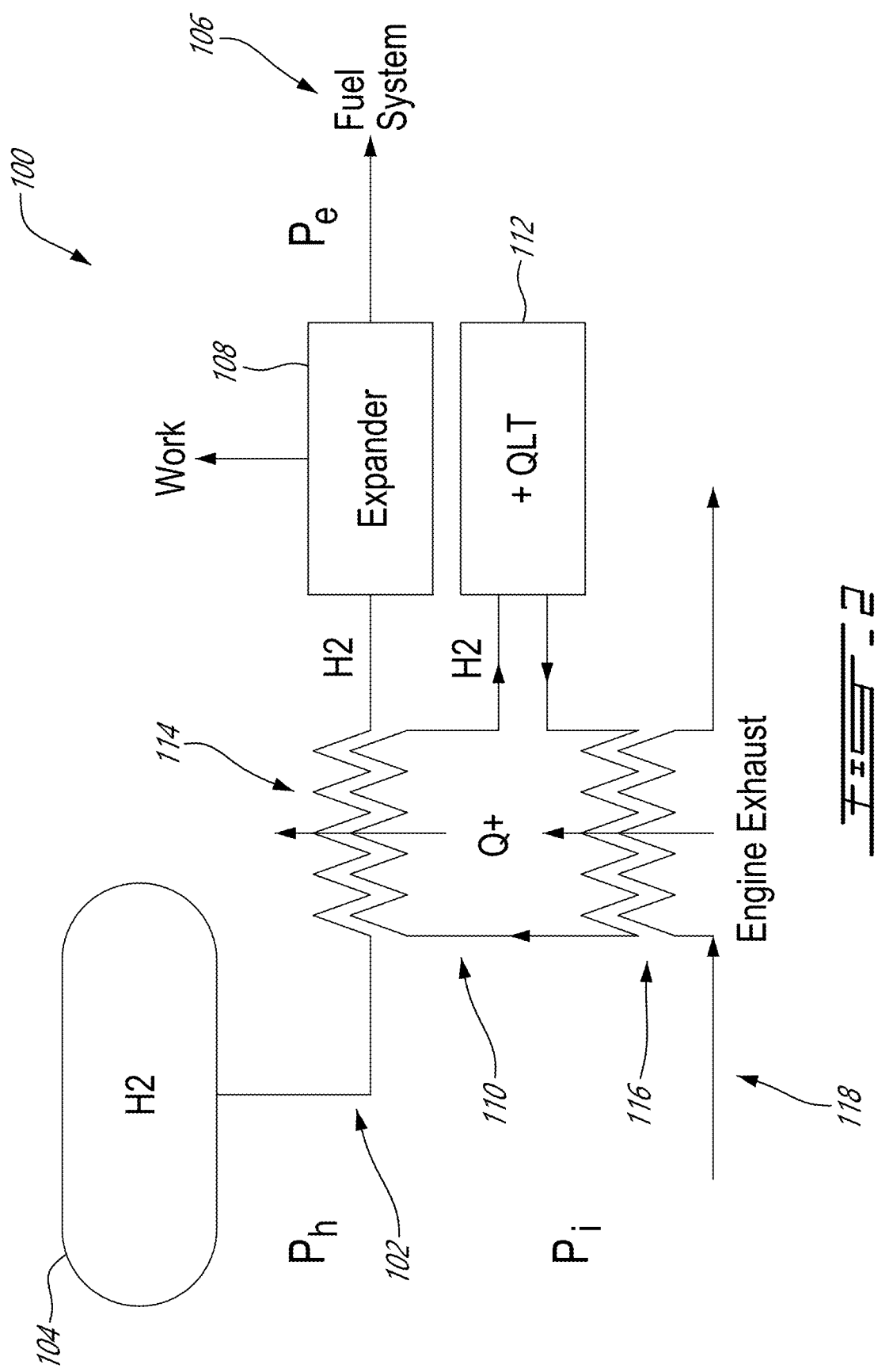
FIG. 2 is schematic view of a heat management system for the engine of FIG. 1.

Referring now to FIG. 2, the heat management system 100 includes a first hydrogen conduit 102 flowing a first flow of hydrogen therethrough, between a source of hydrogen 104 to a fuel system 106. The first flow of hydrogen is thus a source of fuel for the engine 10, stored in the source of hydrogen 104 in a high pressure (pressure $P_h$, for instance at 600-700 bar) and low temperature state. For instance, the first flow of hydrogen is stored in the source of hydrogen 104 (e.g., a hydrogen tank) as a cryogenic fluid or as a pressurized gas. The first hydrogen conduit 102 is thus also referred to as a hydrogen fuel conduit. In the shown embodiment, the first hydrogen conduit 102 illustratively includes an expander 108 upstream of the fuel system 106 and configured for extracting work from the first flow of hydrogen. In some embodiments, the expander 108 is a turbine. Other expander 108 types are contemplated. In other embodiments, the expander 108 is omitted.

The heat management system 100 shown in FIG. 2 further includes a second hydrogen conduit 110, also referred to as an engine cooling conduit. The second hydrogen conduit 110 circulates a second flow of hydrogen from an engine cooling unit 112, for instance one or more oil coolers, to a pair of heat exchangers: a first heat exchanger 114 exchanging heat between first hydrogen conduit 102 and the second hydrogen conduit 110, and a second heat exchanger 116 exchanging heat between the second hydrogen conduit 110 and an engine exhaust conduit 118 through which exhaust gasses of the engine 10 flow. Various types of heat exchangers may be contemplated for first and second heat exchangers 114, 116. The first heat exchanger 114 is illustratively disposed downstream of the second heat exchanger 116 along the second hydrogen conduit 110. The second flow of hydrogen flowing through the second hydrogen conduit 110 is at a pressure Pi that is lower than the pressure $P_h$ flowing through the first hydrogen conduit 102. For instance, in some embodiments, the second flow of hydrogen operates close to ambient pressure.

An exemplary transfer of heat through the heat management system 100 shown in FIG. 2 will now be described. The second flow of hydrogen in the second hydrogen conduit 110, operating at a low pressure Pi as it exits the engine cooling unit 112, is flowed to the second heat exchanger 116. At the second heat exchanger 116, heat is transferred from the hot exhaust gases flowing through the engine exhaust conduit 118 to the second flow of hydrogen flowing through the second hydrogen conduit 110. Stated differently, the second flow of hydrogen is configured to cool the exhaust gases in the engine exhaust conduit 118 by way of the second heat exchanger 116. The second flow of hydrogen is then flowed, along the second hydrogen conduit 110, to the first heat exchanger 114 where heat is transferred from the second flow of hydrogen in the second hydrogen conduit 110 to the first flow of hydrogen in the first hydrogen conduit 102. Stated differently, the second flow of hydrogen, heated by the engine exhaust at the second heat exchanger, is configured to heat the cold, high pressure first flow of hydrogen by way of the first heat exchanger 114. The second flow of hydrogen in the second hydrogen conduit 110, now cooled, is then flowed back to the engine cooling unit 112 to cool various components of the engine 10. The first flow of hydrogen in the first hydrogen conduit 102, now heated, is flowed through the expander 108 to extract work therefrom before flowing towards the fuel system 106 at a pressure $P_e$ lower than the pressure $P_h$ of the flow of hydrogen in the source of hydrogen 104. The heat management system 100 is thus configured for transferring heat from hot exhaust gases in the engine exhaust conduit 118 to a flow of hydrogen fuel in the first hydrogen conduit 102 by way of an intermediate hydrogen conduit (second hydrogen conduit 110).

Advantageously, if a leak were to occur in the first hydrogen conduit 102, the leaking hydrogen would likely be contained by flowing into the second hydrogen conduit 110 (i.e., at the first heat exchanger 114). In addition, in some embodiments, the second hydrogen conduit 110 is operated at a similar pressure to other surrounding components of engine 10, for instance a compressor intercooler or a turbine exhaust. As such, any leakages in the second hydrogen conduit 110, for instance due to micro-cracks, can be mitigated. In some embodiments, the first and/or second hydrogen conduits 102, 110 are monitored so that any potential leaks are detected.

The heat management system 100 shown in FIG. 2 provides a reduction of a temperature gradient as well as buffering between the first hydrogen conduit 102 and the source of heat (i.e., the engine exhaust conduit 118). In addition, as hydrogen is a strong thermal agent and the mass content of the low pressure second hydrogen conduit 110 is relatively low, an uncontrolled ignition of the hydrogen in the second hydrogen conduit 110 would likely have only a minor impact on the engine 10.

Figure 3:
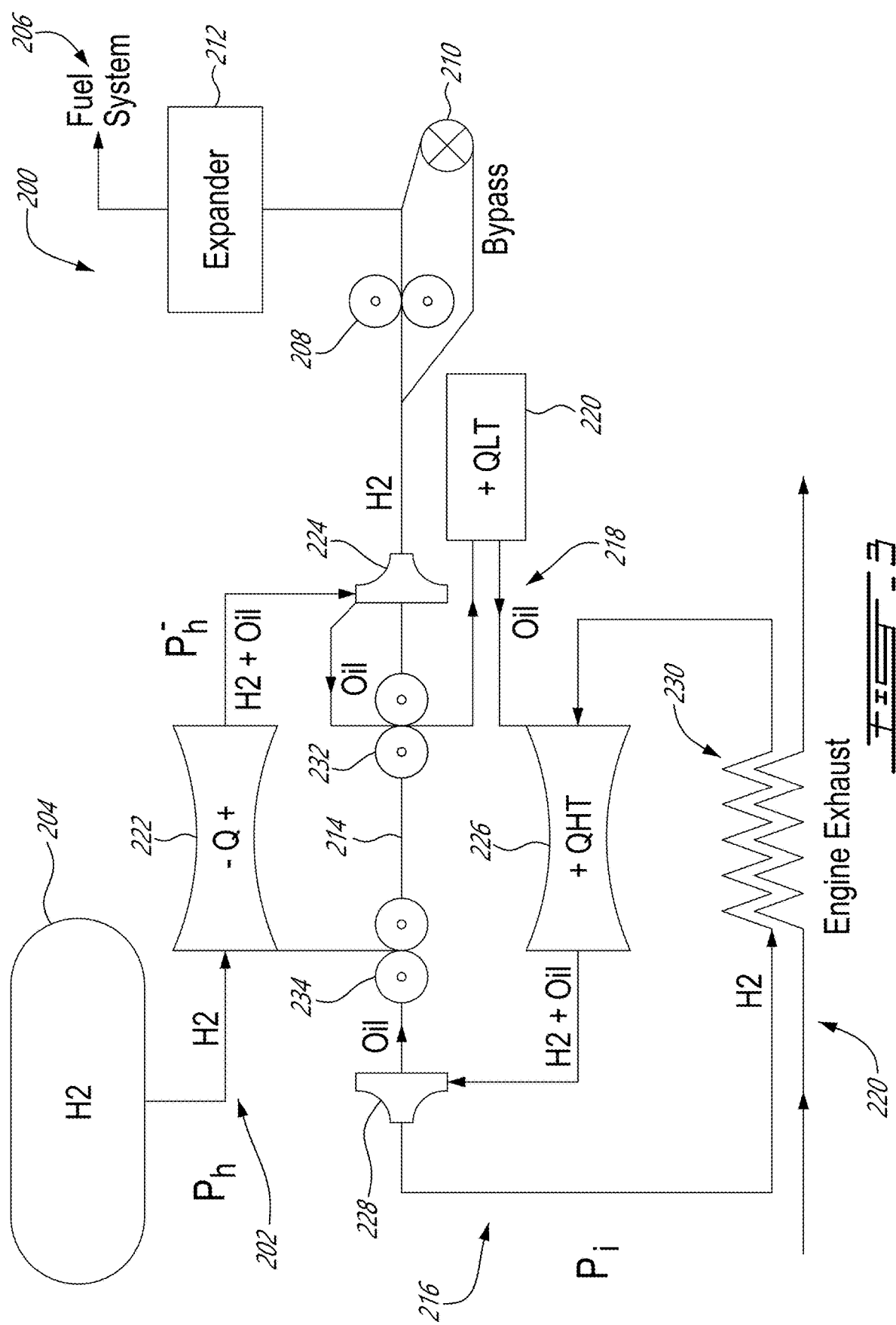
FIG. 3 is a schematic view of a heat management system for the engine of FIG. 1, according to another embodiment.

Referring now to FIG. 3, a heat management system 200 for a thermal engine, for instance engine 10, is shown, in accordance with another embodiment of the present disclosure. Various features and advantages provided by system 100 are also provided by system 100, where applicable, with the differences between the systems detailed below.

The system 200 includes a first hydrogen conduit 202 flowing a first flow of hydrogen therethrough, between a source of hydrogen 204 and a fuel system 206. The first flow of hydrogen is thus a source of fuel for the engine 10, stored in the source of hydrogen 204 in a high pressure (pressure $P_h$, for instance at 600-700 bar) and low temperature state. For instance, the first flow of hydrogen is stored in the source of hydrogen 204 (e.g., a hydrogen tank) as a cryogenic fluid or as a pressurized gas. The first hydrogen conduit 202 is thus also referred to as a hydrogen fuel conduit. In the shown embodiment, the first hydrogen conduit 202 illustratively includes a rotor 208 (disposed in parallel with a bypass valve 210) and an expander 212 upstream of the fuel system 206 and configured for extracting work from the first flow of hydrogen. In some embodiments, the rotor 208 is a roots-type motor driving a utility shaft 214 of the engine 10, and the expander 212 is a turbine. Other rotor 208 and expander 212 types are contemplated. In other embodiments, the rotor 208 and/or the expander 212 are omitted.

The heat management system 200 shown in FIG. 3 further includes a second hydrogen conduit 216, also referred to as an engine cooling conduit. The second hydrogen conduit 216 circulates a second flow of hydrogen therethrough. The second flow of hydrogen flowing through the second hydrogen conduit 216 is at a pressure Pi that is lower than the pressure $P_h$ flowing through the first hydrogen conduit 202. For instance, in some embodiments, the second flow of hydrogen operates close to ambient pressure. The heat management system 200 further includes an additional fluid conduit 218 circulating an additional engine fluid, for instance oil, therethrough. Other fluids capable of operating at high temperatures may be contemplated. The additional fluid conduit 218 circulates fluid from an engine cooling unit 220, for instance one or more oil coolers for the engine 10. As will be discussed in further detail below, the depicted heat management system 200 includes various heat exchange devices and fluid mixers adapted to transfer heat from an engine exhaust conduit 220, to the second flow of hydrogen flowing through the second hydrogen conduit 216, to the additional engine fluid flowing to the additional fluid conduit 218, and to the first flow of hydrogen flowing through the first hydrogen conduit 202.

In particular, system 200 includes: a first mixer 222 and a first separator 224 in fluid communication with both the first hydrogen conduit 202 and the additional fluid conduit 218; a second mixer 226 and a second separator 228 in fluid communication with both the second hydrogen conduit 216 and the additional fluid conduit 220; and a heat exchanger 230 exchanging heat between the second hydrogen conduit 216 and the engine exhaust conduit 220. In the shown case, the first mixer 222 and the second mixer 226 are venturi scrubbers, providing intimate mixing of fluids and, consequently, heat exchange heat therebetween. Other mixer types are contemplated. In addition, various types of heat exchanger for heat exchanger 230 are contemplated.

An exemplary functioning of the system 200 of FIG. 3 will now be described, including the flow of the various fluids and the transfer of heat therebetween. The first flow of hydrogen in the first hydrogen conduit 202 flows from the source of hydrogen 204 and into the first mixer 222, where the first flow of hydrogen mixes with the additional engine fluid in the additional fluid conduit 218. The additional engine fluid, at this location in the additional fluid conduit 218, is at a lower temperature than the first flow of hydrogen. As such, the mixing of these two fluids causes the additional fluid to transfer heat to the first flow of hydrogen. This mixture flows towards to first separator 224 where the fluids are separated. The first flow of hydrogen exits the first separator 224 at a higher temperature following its mixture with the additional fluid. The first flow of hydrogen continues to flow through the first hydrogen conduit 202 towards the rotor 208, expander 212, and fuel system 206 to be used as fuel for the engine 10. In the shown embodiment, bypass valve 210 is disposed in parallel with the rotor 208 to allow the first flow of hydrogen to selectively bypass the rotor 208, for instance to modulate the work extracted from the first flow of hydrogen at the rotor 208 or to modulate the speed of the rotor 208 (and by extension, the speed at which the utility shaft 214 rotates). The additional engine fluid exits the first separator 224 and flows through the additional fluid conduit 218 to a second rotor 232 mounted to the utility shaft 214, where work is extracted from the additional engine fluid. In some embodiments, rotor 232 is a gear motor. Other rotor types are contemplated. The additional engine fluid then flows to the engine cooling unit 220 to provide cooling to one or more components of engine 10.

The second flow of hydrogen, flowing through the second hydrogen conduit 216 at a pressure Pi, flows to heat exchanger 230 where it is heated by the engine exhaust flowing through the engine exhaust conduit 220. The second flow of hydrogen then flows to second mixer 226 where it mixes with the additional engine fluid flowing through the additional fluid conduit 218 from the engine cooling unit 220. Upon mixing, heat from the second flow of hydrogen is transferred to the additional engine fluid, before the mixed fluid flows towards the second separator 228 for separation thereof. Upon separation, the second flow of hydrogen flows through the second hydrogen conduit 216 towards the heat exchanger 230. The oil, now at a higher temperature following mixture with and separation from the second flow of hydrogen, continues to flow through the additional fluid conduit 218 towards a third rotor 234 mounted to the utility shaft 214, where additional work is extracted from the additional engine fluid. This third rotor 234 acts as a pump which brings the oil or intermediate fluid from the low pressure hydrogen circuit (i.e., including the second hydrogen conduit 110) to the high pressure hydrogen circuit (i.e., including the first hydrogen conduit 202). Downstream of the third rotor 234, the additional engine fluid flows towards the first mixer 222 for mixing with the first flow of hydrogen in the first hydrogen conduit 202, as discussed above.

In the depicted embodiment, the first separator 224, second separator 228, first rotor 208, second rotor 232 and third rotor 234 are mounted to the utility shaft 214. As such, the power extracted from the various fluids at the rotors 208, 232, 234 is used to power the separators 224, 228. In addition, hydrogen that accumulates in the second hydrogen conduit can, in some embodiments, flow towards the first hydrogen conduit, through the third rotor, for instance in the form of bubbles.

The heat management system 200 is thus configured for transferring heat from hot exhaust gases in the engine exhaust conduit 220 to a flow of hydrogen fuel in the first hydrogen conduit 202 by way of an intermediate hydrogen conduit (second hydrogen conduit 216) and an additional fluid conduit 218 (e.g., containing oil for engine 10). Whereas the heat management system 100 shown in FIG. 2 relied on a pair of heat exchangers acting as heat transfer devices, the heat management system 200 shown in FIG. 3 relies on a heat exchanger and a pair of mixers (e.g., Venturi scrubbers) acting as heat transfer devices, with the additional engine fluid acting as an intermediary for the transfer of heat between the second flow of hydrogen and the first flow of hydrogen. The quantity of oil mixing with the various flows of hydrogen can vary, for instance based on the required energy transfers.

According to the present disclosure, there provided an exemplary method of operating a heat management system, for instance system 100 or 200, for a thermal engine, for instance engine 10. A first flow of hydrogen is flowed from a source of hydrogen 104, 204 to a fuel system 106, 206 of the engine 10. A second flow of hydrogen is circulated through a first heat transfer device 114, 226 and through a second heat transfer device 116, 230. Heat is transferred from the second flow of hydrogen to the first flow of hydrogen at the first heat transfer device 114, 226 (by way of intermediate fluid conduit 218 and additional heat transfer device 222). Heat is transferred from an engine exhaust pathway 118, 220 to the second flow of hydrogen at the second heat transfer device 116, 230.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A heat management system for a thermal engine, comprising:
   a source of hydrogen;
   a first hydrogen conduit flowing a first flow of hydrogen therethrough, the first hydrogen conduit fluidly coupling the source of hydrogen to a fuel system of the thermal engine;
   a second hydrogen conduit flowing a second flow of hydrogen therethrough, the second hydrogen conduit in thermal communication with an engine exhaust conduit to transfer heat from the engine exhaust conduit to the second hydrogen conduit, the second hydrogen conduit further in thermal communication with the first hydrogen conduit to transfer heat from the second hydrogen conduit to the first hydrogen conduit; and
   an additional fluid conduit flowing an additional engine fluid therethrough, the second hydrogen conduit in thermal communication with the additional fluid conduit to transfer heat thereto, the additional fluid conduit in thermal communication with the first hydrogen conduit to transfer heat thereto.

2. The heat management system as defined in claim 1, wherein the additional fluid conduit includes a mixer and a separator, the mixer configured to mix the additional engine fluid with the first flow of hydrogen to transfer heat from the additional engine fluid to the first flow of hydrogen, the separator configured to separate the additional engine fluid from the first flow of hydrogen downstream of the mixer.

3. The heat management system as defined in claim 2, wherein the additional fluid conduit includes a rotor downstream of the separator, the rotor configured for extracting work from the additional engine fluid flowing through the additional fluid conduit.

4. The heat management system as defined in claim 2, wherein the additional fluid conduit further includes an engine cooling unit, the flow of additional engine fluid circulating between the engine cooling unit, the mixer, and the separator.

5. The heat management system as defined in claim 1, further comprising a heat exchanger exchanging heat between the engine exhaust conduit and the second hydrogen conduit.

6. The heat management system as defined in claim 5, wherein the additional fluid conduit further includes a mixer and a separator, the mixer configured to mix the additional engine fluid with the second flow of hydrogen to transfer heat from the second flow of hydrogen to the additional engine fluid, the separator configured to separate the additional engine fluid from the second flow of hydrogen downstream of the mixer.

7. The heat management system as defined in claim 1, wherein the first flow of hydrogen in the first hydrogen conduit operates at a first pressure and the second flow of hydrogen in the second hydrogen conduit operates at a second pressure less than the first pressure.

8. The heat management system as defined in claim 1, wherein the first hydrogen conduit includes an expander disposed upstream of the fuel system of the thermal engine.

9. An aircraft engine, comprising:
   an engine exhaust conduit;
   a hydrogen fuel conduit flowing hydrogen fuel from a source of hydrogen to a fuel system of the aircraft engine; and
   an engine cooling conduit circulating an additional flow of hydrogen from an engine cooling unit to a first heat transfer device and to a second heat transfer device, the first heat transfer device and the second heat transfer device transferring heat from the engine exhaust conduit to the hydrogen fuel conduit, the engine cooling conduit acting as an intermediate for the transfer of heat between the engine exhaust conduit and the hydrogen fuel conduit.

10. The aircraft engine as defined in claim 9, wherein the first heat transfer device is a first heat exchanger exchanging heat between the hydrogen fuel conduit and the engine cooling conduit, and the second heat transfer device is a second heat exchanger exchanging heat between the engine cooling conduit and the engine exhaust conduit.

11. The aircraft engine as defined in claim 10, wherein the additional flow of hydrogen in the engine cooling conduit circulates between an engine cooling unit, the second heat exchanger and the first heat exchanger.

12. The aircraft engine as defined in claim 9, further comprising an additional fluid conduit flowing an additional engine fluid therethrough, the engine cooling conduit in thermal communication with the additional fluid conduit to transfer heat thereto, the additional fluid conduit in fluid communication with the hydrogen fuel conduit to transfer heat thereto.

13. The aircraft engine as defined in claim 12, wherein the additional fluid conduit includes a mixer and a separator, the mixer configured to mix the additional engine fluid with the fuel to transfer heat from the additional engine fluid to the flow of hydrogen fuel, the separator configured to separate the additional engine fluid from the flow of hydrogen fuel downstream of the mixer.

14. The aircraft engine as defined in claim 12, further comprising a heat exchanger exchanging heat between the engine exhaust conduit and the engine cooling conduit, and wherein the additional fluid conduit further includes a mixer and a separator, the mixer configured to mix the additional engine fluid with the additional flow of hydrogen to transfer heat from the additional flow of hydrogen to the additional engine fluid, the separator configured to separate the additional engine fluid from the additional flow of hydrogen downstream of the mixer.

15. The aircraft engine as defined in claim 9, wherein the flow of hydrogen fuel in the hydrogen fuel conduit operates at a first pressure and the additional flow of hydrogen in the engine cooling conduit operates at a second pressure less than the first pressure.

16. The aircraft engine as defined in claim 9, wherein the hydrogen fuel conduit includes an expander disposed upstream of the fuel system.

17. A method of operating a heat management system for a thermal engine, comprising:
   flowing a first flow of hydrogen from a source of hydrogen to a fuel system of the thermal engine;
   circulating a second flow of hydrogen between an engine cooling unit, a first heat transfer device, and a second heat transfer device;

transferring heat from the second flow of hydrogen to the first flow of hydrogen at the first heat transfer device; and transferring heat from an engine exhaust pathway to the second flow of hydrogen at the second heat transfer device.

\* \* \* \* \*